UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

FINISH-REMOVER.

1,172,772. Specification of Letters Patent. Patented Feb. 22, 1916.

No Drawing. Application filed August 11, 1909. Serial No. 512,310.

*To all whom it may concern:*

Be it known that I, CARLETON ELLIS, a citizen of the United States, and now residing at Montclair, county of Essex, and State of New Jersey, have made certain new and useful Inventions Relating to Finish-Removers, of which the following is a specification.

This invention relates to finish removers and relates especially to removers in which the inflammability of the various solvents is reduced or suppressed by the use of chlorinated solvents or the like and in which suitable thickeners preferably comprising waxes and nitrocellulose or celluloid are employed.

Chlorinated ethylene of various degrees of chlorination is desirable for use in finish removers and is comparatively free from objection on account of its odor. The commercial pentachlorethylene, or pentachlorethane as it is sometimes called for instance, has an odor similar to that of turpentine. Trichlorethylene and both pentachlorethane and tetrachlorethylene are also desirable chlorinated solvents and may be used in connection with the alcoholic or other loosening or other finish solvent material and preferably incorporated with suitable thickeners as well as preservative or antacid material if desired. In some cases, such as in steamboat work, where an especially noninflammable remover is desired cresylic acid or other phenolic material may be incorporated in suitable proportions which will also have a desirable antiseptic action. An illustrative remover may comprise the following ingredients: pentachlorethane 10 gallons, tetrachlorethylene 40 gallons, ethyl alcohol 50 gallons, methyl alcohol 2½ gallons, celluloid 45 pounds, ceresin wax 25 pounds, dry soap 10 pounds, sodium benzoate 5 pounds. This remover may preferably be prepared by dissolving the celluloid in the alcoholic solvent material in a strong mixing apparatus in which the solvent action is energetically promoted. The chlorinated solvents may then be added very gradually in order to avoid precipitating the celluloid and an excessive quantity of the chlorinated solvents should be avoided for a similar reason. The mixture may then be heated to 40 or 50 degrees C. and the wax added preferably in a melted condition and then the sodium benzoate and dry soap or other antacid material preferably in finely powdered condition thoroughly incorporated and the mixture cooled after filtering when in a heated condition if desired, although, of course, it is understood that the ingredients may be incorporated in other ways. Such antacid or palliative material of course prevents or neutralizes any slight acid tendency in removers containing chlorinated solvents for instance as is known in the art. This formula gives a remover of syrupy or smooth pasty consistency desirable for general purposes, although of course the incorporation of more of the ordinary laundry soap or various potash or other soaps if desired gives a greater consistency so that by the use of larger quantities a stiff or jelly-like remover may be secured, or by using less of the stiffening material the remover may be made more fluent so as to approach the fluidity of the solvents themselves. The soap is highly desirable in this connection in preventing the cellulose or celluloid from forming a hard adherent film in case the remover should be allowed to become entirely dry on the wood to which it is applied, or on brushes or other articles. Other suitable illustrative removers may be prepared according to the following formulas:

Carbon tetrachlorid 40 gallons, ethyl alcohol 57 gallons, methyl alcohol 3 gallons, celluloid 45 pounds, paraffin wax 12 pounds, sodium benzoate 12 pounds.

Carbon tetrachorid 45 gallons, ethyl alcohol 53 gallons, methyl alcohol 2 gallons, celluloid 45 pounds, paraffin wax 11 pounds, ceresin wax 6 pounds, sodium benzoate 10 pounds, dry soap 10 pounds.

Trichlorethylene 50 gallons, ethyl alcohol 50 gallons, methyl alcohol 2½ gallons, celluloid 35 pounds, Japan wax 10 pounds, paraffin wax 10 pounds, dry soap 8 pounds.

Trichlorethylene 10 gallons, carbon tetrachlorid 40 gallons, ethyl alcohol 57 gallons, methyl alcohol 3 gallons, celluloid 40 pounds, cresylic acid 20 gallons, sodium carbolate 5 pounds, sodium benzoate 8 pounds, sodium stearate 8 pounds, paraffin wax 20 pounds.

Having described this invention in connection with a number of illustrative ingredients, formulas, proportions and methods of preparation, to the details of which disclosure the invention is not of course to be limited, what is claimed is:

1. The substantially fluent finish remover of syrupy consistency comprising approximately pentachlorethane 10 gallons, tetrachlorethylene 40 gallons, ethyl alcohol 50 gallons, methyl alcohol 2½ gallons, celluloid 45 pounds, ceresin wax 25 pounds, dry soap 10 pounds and sodium benzoate 5 pounds.

2. The substantially fluent finish remover comprising pentachlorethane and tetrachlorethylene 50 gallons, ethyl alcohol 50 gallons, celluloid 45 pounds, ceresin wax and soap.

3. The finish remover comprising chlorinated ethylene 50 gallons, alcohol 50 gallons, celluloid 45 pounds and waxy stiffening material and soap.

4. The finish remover comprising chlorinated ethylene, a substantially equal portion of alcohol with which nitrocellulose and waxy and soapy stiffening material have been incorporated.

5. The finish remover comprising considerable proportions of chlorinated ethylene and of loosening finish solvent material and incorporated stiffening material comprising wax and nitrated cellulose.

6. The finish remover comprising chlorinated finish solvent material comprising pentachlorethane, miscible finish solvent material and incorporated stiffening material comprising nitrated cellulose.

7. The finish remover comprising considerable proportions of chlorinated finish solvent material including chlorinated ethylene, miscible organic volatile finish solvent material and incorporated stiffening material comprising antacid material.

8. The substantially fluent finish remover consisting in greater part of volatile composite organic finish solvent material including chlorinated solvents and incorporated stiffening material including celluloid, soap and waxy evaporation-retarding material.

9. The substantially fluent finish remover consisting in greater part of volatile composite organic finish softening material and incorporated stiffening material including celluloid and soap.

10. The finish remover comprising considerable proportions of composite chlorinated finish solvent material including chlorinated ethylene and miscible organic volatile finish solvent material incorporated therewith.

11. The finish remover comprising considerable proportions of chlorinated finish solvent material including chlorinated ethylene, incorporated miscible volatile finish solvent material and antacid material.

12. The finish remover comprising considerable proportions of chlorinated finish solvent material including pentachlorethane and incorporated miscible organic volatile finish solvent material.

13. The finish remover comprising considerable proportions of chlorinated finish solvent material including pentachlorethane, incorporated miscible organic finish solvent material and incorporated stiffening material.

14. The finish remover comprising considerable proportions of chlorinated finish solvent material including chlorinated ethylene, miscible organic volatile solvent material incorporated therewith and incorporated stiffening material.

CARLETON ELLIS.

Witnesses:
FLORENCE E. WOLFE,
JESSIE B. KAY.